3,649,555
PHOSPHOR COMPOSITIONS AND PROCESS FOR UPGRADING YTTRIUM ORTHOVANADATE PHOSPHORS
James E. Mathers, Ulster, and Sam Z. Toma, Towanda, Pa., assignors to Sylvania Electric Products Inc.
No Drawing. Filed Sept. 8, 1970, Ser. No. 70,516
Int. Cl. C09k *11/14, 1/10, 1/12*
U.S. Cl. 252—301.65
4 Claims

ABSTRACT OF THE DISCLOSURE

A red-emitting phosphor composition for cathode ray tubes consisting essentially of a red-emitting cathodoluminescent phosphor selected from the group consisting of yttrium oxide and yttrium oxysulfide as a first component and as second component a substantially uniform blend consisting essentially of from about 90% to about 99.5% by weight of europium-activated yttrium orthovanadate and from about 0.5% to about 10% by weight of a yellow-emitting silver activated zinc cadmium sulfide.

BACKGROUND OF THE INVENTION

Field of the invention

This invention relates to cathodoluminescent phosphor compositions. More particularly, it relates to a red-emitting cathodoluminescent phosphor composition useful as the red-component in the tri-color color television.

Description of prior art

In color television three cathodoluminescent phosphors that emit red, blue and green light are deposited in a desired pattern upon a panel that forms the viewed portion of a cathode ray tube.

In the early development of color television red-emitting zinc cadmium sulfide phosphors were used as the red-emitting component. A color picture having proper color generally was of insufficient brightness to be viewed under light conditions that existed in most rooms where television was to be viewed. In most instances, therefore, it was necessary to darken the room to be able to observe a color picture that resembled natural colors. Of the three phosphors the red-emitting component was the one with the highest deficiency in desired brightness. Attempts to improve the brightness of most of the early red-emitting phosphors generally resulted in a more orange color thereby yielding a distorted color picture.

A major breakthrough in color television was the introduction of europium-activated yttrium orthovanadate, which compared to the early red-emitting phosphors, was extremely bright and enabled the fabrication of a color picture tube that could be viewed under the ambient light conditions that exists in most rooms under normal lighting conditions.

Concurrently, with the development of the yttrium orthovanadate other rare earth-activated, rare earth phosphors were developed and investigated as possible candidates for the red-emitting phosphors. Europium-activated yttrium oxysulfide was found to be an additional red-emitting phosphor that was similar to yttrium orthovanadate. Additionally, it was found that europium activated yttrium oxide was one of the better red-emitting phosphor materials when subjected to cathode ray excitation. Both the color of emission and its brightness were superior to any other known red-emitting phosphor. Several disadvantages had to be overcome, however, before europium-activated yttrium oxide replaced yttrium orthovanadate as a red-emitting phosphor for color television. For example, while yttrium orthovanadate could be reclaimed without changing its composition, yttrium oxide in most instances has to be dissolved, precipitated as an oxalate and oxidized under heat to form the oxide phosphor. Particle size of yttrium oxide was hard to control thereby making it difficult to obtain the correct particle size for the various methods used to deposit the phosphor on the screen. Additionally, there is a tendency for yttrium oxide to react with the sensitizers in the photoresist solutions that are normally used in the photochemical deposition of phosphor on the panel. Solutions were found to most of these disadvantages and recently yttrium oxide has become the most prevalent red-emitting phosphor used in color television.

There are considerable inventories of yttrium orthovanadate in stock. Also, since its manufacture is relatively simple, it is more readily reclaimable and is not as reactive with photoresist materials, as yttrium oxide, it is more economical to use yttrium orthovanadate. Therefore, even though yttrium orthovanadate is not as bright as yttrium oxide it can be advantageous to use at least some yttrium orthovanadate.

It is believed, therefore, that a phosphor composition having essentially the same color coordinates as yttrium oxide, contains some yttrium orthovanadate thereby lowering the overall cost of the phosphor and thereby reduces the magnitude of some of the problems in manufacturing a viewing panel without a significant loss in brightness would be an advancement in the art.

It is further believed that an additive which has a brightness greater than yttrium orthovanadate and reduces the cost of the red component without an appreciable shift of color emission is an additional advancement in the art.

SUMMARY OF THE INVENTION

In accordance with one aspect of this invention, there is provided a cathodoluminescent red-emitting phosphor composition consisting essentially of a first phosphor selected from the group consisting of red-emitting yttrium oxide and yttrium oxysulfide and as a second component a substantially uniform blend of from about 90% to about 99.5% by weight of europium-activated yttrium orthovanadate and from about 0.5% to about 10% by weight of a yellow-emitting silver-activated zinc cadmium sulfide.

In accordance with an additional aspect of this invention there is provided an additive to a red-emitting phosphor consisting essentially of from about 90% to about 99.5% by weight of europium activated yttrium orthovanadate and from about 0.5% to about 10% by weight of a yellow-emitting silver-activated zinc cadmium sulfide having a zinc to cadmium weight ratio of from about 45:55 to about 55:45.

For a better understanding of the present invention, together with other and further objects, advantages and capabilities thereof, reference is made to the following disclosure and appended claims in connection with the above description of some the aspects of the invention.

DESCRIPTION OF THE PREFERRED EMBODIMENTS

It has been found that relatively small amounts of a yellow-emitting silver activated zinc cadmium sulfide will not only provide a controlled color shift from the $x$ and $y$ color co-ordinates of the yttrium orthovanadate but also the brightness of the emission is effectively increased. The yellow emission sulfide is advantageous since it is one of the most efficient cathode ray phosphors known having a very high radiant efficiency as well as an exceptional luminous efficiency. It is also to be noted that although some absorption of red emission would be expected apparently this effect is not significant. Furthermore, such characteristics as decay time, reactiveness with photoresists and the like are not affected by the zinc-cadmium sulfide addition.

In general, the addition of each 0.5% of silver activated zinc cadmium sulfide having $x$ and $y$ color coordinates of 0.429 and 0.551 respectively should shift the $x$ coordinate of a yttrium orthorvanadate about 0.004 unit and the $y$ coordinate by about 0.003 unit. The value of $x$ is decreased and $y$ is increased with the addition of silver-activated zinc cadmium sulfide.

The brightness of the emission has been found to increase significantly. For example, the brightness of a yttrium orthovanadate phosphor having an initial relative brightness of about 10 foot lamberts is increased to about 12.4 foot lamberts by the addition of about 5% of silver-activated zinc cadmium sulfide. Larger amounts of sulfide additions yield a corresponding increase in brightness, however, above about 10% the color shift is too great for most applications.

The silver-activated zinc cadmium sulfide of interest has a particle size similar to that of the yttrium orthovanadate, therefore, physical blending of the two materials affords a method by which a relatively uniform mixture can be obtained. Thus, in controlling the color of emission it is only necessary to add the desired amount of silver-activated zinc cadmium sulfide to the yttrium orthovanadate.

The weight ratio of zinc to cadmium in the zinc cadmium sulfide will be from about 45:55 to about 55:45 and a silver concentration of from about .0025 to about .025 weight percent with a 50:50 ratio being preferred. An increase in cadmium content increases the value of $x$ and decreases the value of $y$. About 1% increase in cadmium content in the range from 45% to 55% increases the value of the $x$ coordinate about 0.010 unit and decreases the value of the $y$ color coordinate about 0.006 unit.

The amount of the mixture of yttrium orthovanadate and silver-activated zinc cadmium sulfide that will be used is dependent upon the brightness of the yttrium oxide or yttrium oxysulfide and the desired brightness in the end product. In most instances from about 25% to about 75% by weight of the total phosphor compositions will be the first component of yttrium oxide or yttrium oxysulfide and about 25% to about 75% by weight of the second component to achieve significant benefits of this invention.

To more fully illustrate the subject invention, the following detailed examples are presented. All parts, percentages and proportions are by weight unless otherwise indicated.

EXAMPLE I

Mixtures of various amounts of europium activated yttrium orthovanadate and silver-activated zinc cadmium sulfide phosphor are prepared by blending the components thoroughly to give a homogeneous mixture of vanadate phosphor and sulfide phosphor particles. The resultant yttrium orthovanadate-zinc cadmium sulfide phosphor emits a brilliant red luminescence when excited by cathode-rays. This new phosphor has an increased cathodoluminescent efficiency versus the undoped vanadate and with a visual color only slightly less saturated. Table I shows the data on the various phosphors.

TABLE I

| Weight percent | | Percent brightness | Color coord. | |
|---|---|---|---|---|
| Zn(Cd)S:Ag | YVO₄:Eu | | X | Y |
| None—Control | 100 | 100 | 0.676 | 0.318 |
| 0.5 | 99.5 | 102 | 0.674 | 0.320 |
| 1 | 99 | 103 | 0.671 | 0.323 |
| 2 | 98 | 106 | 0.667 | 0.327 |
| 3 | 97 | 113 | 0.655 | 0.338 |
| 4 | 96 | 119 | 0.648 | 0.344 |
| 5 | 95 | 124 | 0.642 | 0.350 |
| 10 | 90 | 143 | 0.617 | 0.374 |

EXAMPLE II

Various phosphor compositions are prepared by adding varying amounts of yttrium orthovanadate-zinc cadmium sulfide phosphor components to europium-activated yttrium oxide. Data for the resulting red-emitting phosphor composition are given below.

TABLE II

| Weight percent | | | Percent brightness | Color coord. | |
|---|---|---|---|---|---|
| YVO₄ | Y₂O₃:Eu | (YVO₄:Eu+Zn,CdS:Ag) | | X | Y |
| 100 | 0 | 0 | 100 | 0.676 | 0.318 |
| 0 | 50 | ¹ 50 | 132 | 0.663 | 0.331 |
| 0 | 25 | ² 75 | 132 | 0.643 | 0.350 |
| 0 | 100 | 0 | 170 | 0.662 | 0.331 |

¹ 95% YVO₄:Eu+5% Zn, CdS:Ag.
² 90% YVO₄:Eu+10% Zn, CdS:Ag.

While there have been shown and described what are at present considered the preferred embodiments of the invention, it will be obvious to those skilled in the art that various changes and modifications may be made therein without departing from the scope of the invention as defined by the appended claims.

What is claimed is:

1. A phosphor composition consisting essentially of from about 25% to about 75% by weight of the total composition of a first red-emitting phosphor component selected from the group consisting of europium activated yttrium oxide and europium activated yttrium oxysulfide and from about 25% to about 75% by weight of the total composition of a second phosphor component consisting essentially of from about 90% to about 99.5% by weight of said second component of red-emitting europium activated yttrium orthovanadate phosphor and from about 0.5% to about 10% by weight of said second component of a yellow-emitting silver-activated zinc cadium sulfide having a zinc to cadmium weight ratio of from about 45:55 to about 55:45.

2. A composition according to claim 1 wherein said red-emitting phosphor is europium activated yttrium oxide.

3. A composition according to claim 2 wherein said silver-activated zinc cadmium sulfide is from about 1.0% to about 10% by weight of said second component.

4. An additive for a red-emitting phosphor consisting essentially of from about 90% to about 95.5% of europium activated yttrium orthovanadate and from about 0.5% to about 10% by weight of a yellow-emitting silver-activated zinc cadmium sulfide having a zinc-to-cadmium weight ratio of from about 45:55 to about 55:45.

References Cited

UNITED STATES PATENTS

| 2,732,347 | 1/1956 | Ward | 252—301.6 S |
| 3,010,909 | 11/1961 | Klasens et al. | 252—301.6 S |
| 3,322,682 | 5/1967 | Thompson | 252—301.4 R |
| 3,440,080 | 4/1969 | Tamura et al. | 252—301.4 R |

TOBIAS E. LEVOW, Primary Examiner

J. COOPER, Assistant Examiner